US010381647B2

(12) United States Patent
Tsutsumi (10) Patent No.: US 10,381,647 B2
(45) Date of Patent: Aug. 13, 2019

(54) ALKALINE SECONDARY CELL

(71) Applicant: Exergy Power Systems, Inc., Tokyo (JP)

(72) Inventor: Kaduo Tsutsumi, Tokyo (JP)

(73) Assignee: EXERGY POWER SYSTEMS, INC., Tokyo (JP)

( * ) Notice: Subject to any disclaimer, the term of this patent is extended or adjusted under 35 U.S.C. 154(b) by 312 days.

(21) Appl. No.: 15/117,315

(22) PCT Filed: Jan. 5, 2015

(86) PCT No.: PCT/JP2015/050010
§ 371 (c)(1),
(2) Date: Aug. 8, 2016

(87) PCT Pub. No.: WO2015/118892
PCT Pub. Date: Aug. 13, 2015

(65) Prior Publication Data
US 2016/0351907 A1   Dec. 1, 2016

(30) Foreign Application Priority Data
Feb. 10, 2014   (WO) .................. PCT/JP2014/053088

(51) Int. Cl.
| H01M 4/62 | (2006.01) |
| H01M 10/34 | (2006.01) |
| H01M 10/24 | (2006.01) |
| H01M 2/16 | (2006.01) |
| H01M 4/32 | (2006.01) |
| H01M 4/38 | (2006.01) |
| H01M 4/24 | (2006.01) |

(52) U.S. Cl.
CPC ........... *H01M 4/625* (2013.01); *H01M 2/162* (2013.01); *H01M 4/32* (2013.01); *H01M 4/622* (2013.01); *H01M 10/24* (2013.01); *H01M 10/34* (2013.01); *H01M 10/345* (2013.01); *H01M 4/242* (2013.01); *H01M 4/383* (2013.01)

(58) Field of Classification Search
CPC ........ H01M 4/625; H01M 4/242; H01M 4/24; H01M 4/623; H01M 4/622; H01M 4/383; H01M 10/24; H01M 10/345; H01M 10/34
See application file for complete search history.

(56) References Cited

U.S. PATENT DOCUMENTS

| 4,127,703 A | 11/1978 | Holleck |
| 6,171,727 B1 | 1/2001 | Ogura et al. |

FOREIGN PATENT DOCUMENTS

| CN | 1216405 | * | 5/1999 |
| EP | 0 851 520 A2 | | 7/1998 |
| EP | 0 851 520 A3 | | 7/1998 |
| JP | 61-39461 A | | 2/1986 |
| JP | 1-204371 A | | 8/1989 |
| JP | 2-250260 A | | 10/1990 |
| JP | 6-124703 A | | 5/1994 |
| JP | 11-97008 A | | 4/1999 |
| JP | 11-233106 A | | 8/1999 |
| JP | 2000-327819 A | | 11/2000 |
| JP | 2002-203530 A | | 7/2002 |
| JP | 2002203530 A | | 7/2002 |
| JP | 3433039 B2 | * | 5/2003 |
| JP | 3433039 B2 | | 8/2003 |
| JP | 2007-207525 A | | 8/2007 |
| JP | 2008-171515 A | | 7/2008 |
| JP | 2010-010097 | * | 1/2010 |
| JP | 2010-10097 A | | 1/2010 |
| JP | 20100010097 A | | 1/2010 |
| JP | 4641329 B2 | * | 3/2011 |
| JP | 2012-199203 A | | 10/2012 |
| JP | 2012-204177 | * | 10/2012 |
| JP | 2014-35858 A | | 2/2014 |
| JP | 5515028 B2 | | 6/2014 |
| JP | 5648772 B1 | | 1/2015 |
| RU | 2 020 656 C1 | | 9/1994 |
| RU | 2 229 185 C1 | | 5/2004 |
| WO | 96/17393 A1 | | 9/1996 |
| WO | 2012/173091 A1 | | 12/2012 |
| WO | 2012173091 A1 | | 12/2012 |

OTHER PUBLICATIONS

Extended (supplementary) European Search Report dated Jun. 26, 2017, issued in counterpart European Application No. 15745785.4. (8 pages).
Office Action dated Feb. 26, 2018, issued in counterpart Chinese Application No. 201580007665.8, with English translation and Japanese translation (16 pages).
Office Action dated Feb. 2, 2018, issued in counterpart Russian Application No. 2016134026, with English translation (10 pages).
Search Report dated May 1, 2015, issued in counterpart Russian Application No. 2016134026, with English translation (4 pages).
International Search Report dated Apr. 28, 2015, issued in counterpart International Application No. PCT/JP2015/050010 (2 pages).
Office Action dated Oct. 15, 2018, issued in counterpart Chinese Application No. 201580007665.8 (7 pages).

* cited by examiner

*Primary Examiner* — Laura Weiner
(74) *Attorney, Agent, or Firm* — Westerman, Hattori, Daniels & Adrian, LLP (57) ABSTRACT

Carbon or cobalt, which is used as a conductive agent in an electrode of an alkaline secondary cell, is oxidized by oxygen generated from a positive electrode. The conductive agent degraded by oxidization loses its conductivity through repetitive charge and discharge, resulting in shortening of the cycle life of the cell. In an alkaline secondary cell filled with hydrogen, hydrogen generated from a positive electrode is bound to the hydrogen. This prevents a conductive agent in an electrode from being degraded by oxidization. A cell with excellent cycle life characteristic is thus provided.

13 Claims, 8 Drawing Sheets

ALKALINE SECONDARY CELL

TECHNICAL FIELD

The invention relates to a secondary cell, more specifically, to an alkaline secondary cell in which a conductive agent includes carbon.

BACKGROUND ART

Nickel-metal hydride cells have excellent output characteristics and deliver stable charge and discharge performance. Therefore, nickel-metal hydride cells are now in widespread use for, for example, home electric appliances, mobile devices such as a mobile phone and a notebook personal computer, and rechargeable electric tools.

Nickel-metal hydride cells are also expected as emergency power supplies in reliability-oriented facilities such as a factory and a hospital. Furthermore, nickel-metal hydride cells play a role in alleviating power fluctuations or contribute to peak power reduction, in combination with natural energy-utilizing power generation facilities that generate power varying in amount depending on weather conditions such as wind and sunlight. Therefore, the use of nickel-metal hydride cells is also expected in various fields for the purpose of ensuring power system stability.

Patent Literature 1 discloses the exemplary use of a nickel-metal hydride secondary cell in an interconnected power system. Patent Literature 2 discloses an alkaline secondary cell that includes a positive electrode containing manganese dioxide rather than nickel hydroxide.

With regard to nickel-metal hydride cells, charge-discharge reactions in an alkaline electrolyte may be represented by the following formulae. In the respective formulae, M represents a metal element (hydrogen storage alloy).

[Formula 1]

[Formula 2]

[Formula 3]

In charging, nickel hydroxide in a positive electrode is oxidized to nickel oxyhydroxide whereas a metal (hydrogen storage alloy) in a negative electrode turns into a hydride by storing hydrogen generated by the electrolysis of water. In discharging, on the other hand, the metal in the negative electrode releases hydrogen, so that electricity is generated together with water.

Typically, a metal oxide is a poor conductor. In an alkaline secondary cell, nickel hydroxide and manganese dioxide to be used as a positive electrode active material each are a metal oxide with considerably low conductivity. In order to overcome this disadvantage, for example, Patent Literature 3 discloses an active material obtained by adding a higher-order cobalt oxide as a conductive agent to nickel hydroxide. According to the active material, the higher-order cobalt oxide forms a conductive network between the nickel hydroxide particles. This conductive network promotes occurrence of a charge-discharge reaction at the entire nickel hydroxide particles, leading to an increase in capacity.

Cobalt is expensive and has a large specific gravity. Patent Literatures 4, 5 each disclose an inexpensive active material obtained by addition oft as a conductive agent, a graphitized carbon material instead of an expensive higher-order cobalt oxide.

A separator, which constitutes a main part of a secondary cell, plays an important role on cell performance. Specifically, a separator separates a positive electrode from a negative electrode, prevents a short circuit, absorbs and retains an electrolyte, and allows the permeation of gas generated by an electrode reaction. Hence, the separator is required to be hydrophilic.

In regard to this, for example, Patent Literature 6 discloses a technique for providing a cell separator which is suitable for an alkaline secondary cell and has an excellent hydrophilic property under a long-term storage condition or a dried condition, the technique involving sulfonating a polyolefin nonwoven fabric applied with an alkylphosphate anionic surfactant.

Patent Literature 7 discloses a sulfonating process that allows uniform introduction of a sulfonate group and inhibits a decrease in strength, and a method for fabricating a cell separator, the method including moistening a sheet with water and bringing the sheet into contact with sulfuric anhydride gas.

CITATIONS LIST

Patent Literatures

Patent Literature 1: JP 2008-171515 A
Patent Literature 2: WO 2012/173091 A1
Patent Literature 3: JP H11-97008 A
Patent Literature 4: Japanese Patent No. 3,433,039
Patent Literature 5: Japanese Patent No. 4,641,329
Patent Literature 6: JP 2012-199203 A
Patent Literature 7: JP 2000-327819 A

SUMMARY OF INVENTION

Technical Problems

Nickel hydroxide to be used as a positive electrode active material for an alkaline secondary cell has low conductivity. In order to overcome this disadvantage, an active material has been adopted, in which a higher-order cobalt oxide is added as a conductive agent to nickel hydroxide. However, an alkaline secondary cell that employs this active material is susceptible to high overvoltage and is difficult to output high power.

Amorphous carbon such as acetylene black has been known as an inexpensive conductive agent of low specific gravity. The conductive agent exhibits satisfactory conductivity, but is inferior in corrosion resistance. Therefore, the conductive agent is degraded by oxidation through repetitive charge and discharge, so that the conductivity thereof is gradually lowered.

If a carbon material is used as a conductive agent for a positive electrode, carbon is bound to oxygen in a cell. The carbon is oxidized to a carboxyl group (COOH) and a carbonate, so that the positive electrode loses its conductivity. This results from the nature of carbon, that is, carbon is resistant to reduction, but is sensitive to oxidation. The oxidation proceeds particularly in charging.

As disclosed in, for example, Patent Literatures 4, 5, an active material may be obtained as follows. A graphitized carbon material is prepared by firing, at high temperature, graphite or a carbon material obtained by a vapor deposition method. This graphitized carbon material is added as a conductive agent to nickel hydroxide, in place of a higher-order cobalt oxide. An alkaline secondary cell that employs graphite as a conductive agent is lower in internal resistance and overvoltage than an alkaline secondary cell that employs an active material to which a higher-order cobalt oxide is added. However, long-term repetitive charge and discharge cause oxidation of the carbon material, resulting in lowering of conductivity. Consequently, such an alkaline secondary cell has short cycle life.

A cobalt compound used as a conductive agent in a positive electrode elutes in an electrolyte, so that a cobalt complex ion is formed. In charging, the cobalt complex ion is oxidized to cobalt oxyhydroxide (β-CoOOH) which is deposited again near the positive electrode. In overdischarging, the cobalt oxyhydroxide is reduced to cause the decay of a conductive matrix, which hinders charging. This shortens the cycle life of a cell, resulting from the nature of cobalt, that is, cobalt is sensitive to reduction.

Oxygen generated from a positive electrode in charging causes oxidation of lanthanum and manganese in a hydrogen storage alloy of a negative electrode, which lowers the hydrogen storage ability of the hydrogen storage alloy. The hydrogen storage alloy repeats expansion and contraction by hydrogen storage and release and is pulverized with an increase in crystal lattice spacings. The pulverization of the hydrogen storage alloy causes an increase in surface area and therefore promotes the oxidation of the hydrogen storage alloy. Repetitive charge and discharge lower the hydrogen storage ability of the hydrogen storage alloy and shorten the cell life.

In view of the above circumstances, the invention provides an alkaline secondary cell which is excellent in cycle characteristic, with the development of an alkaline secondary cell that undergoes no degradation by oxidation of both a conductive agent and a hydrogen storage alloy even after repetitive charge and discharge.

The above disadvantages can be overcome in such a manner that hydrogen gas is sealed inside the alkaline secondary cell as will be described later in detail with regard to the reasons why the disadvantages can be overcome. Sulfonating treatment is a well-known technique of imparting a hydrophilic property to a separator. In the hydrophilic separator obtained by the sulfonating treatment, a sulfo group (—$SO_3H$) is reduced by hydrogen to $H_2SO_4$. The separator thus loses its hydrophilic property.

A hydroxy group (—OH) may be used for imparting the hydrophilic property to the separator by corona discharge and plasma discharge. However, the hydroxy group is reduced by hydrogen to water, so that the separator loses its hydrophilic property.

Heretofore, as described above, the use of the conventional separator in the hydrogen gas is disadvantageous from the viewpoint of cell life.

An ethylene-vinylacetate (EVA) copolymer has been widely used as a binder for an alkaline secondary cell. However, the binder such as EVA is reduced and degraded due to hydrogen when being used in a hydrogen gas atmosphere for a long period of time. The reduced and degraded binder might lose its own function.

Solutions to Problems

An alkaline secondary cell of the invention includes a negative electrode containing a hydrogen storage alloy, and a positive electrode containing a positive electrode active material and a conductive agent. Hydrogen gas is filled in the alkaline secondary cell. The conductive agent includes carbon. The negative electrode and the positive electrode are in contact with the hydrogen gas. Both a negative electrode surface and a positive electrode surface may alternatively be in contact with the hydrogen gas.

With this configuration, both the conductive agent in the positive electrode and the hydrogen storage alloy in the negative electrode are not degraded by oxidization.

In the alkaline secondary cell of the invention, the conductive agent includes partly graphitized soft carbon.

In the alkaline secondary cell of the invention, the conductive agent includes soft carbon obtained by firing a soft carbon precursor at 1500 to 2800° C.

In the alkaline secondary cell of the invention, the conductive agent includes particulate soft carbon with a degree of graphitization (G value) from 0.3 or more to 0.8 or less analyzed by Raman spectroscopy.

In the alkaline secondary cell of the invention, the soft carbon is granulated. The soft carbon as the conductive agent may be formed by granulation. Also in the alkaline secondary cell of the invention, the positive electrode active material in the positive electrode is coated with the soft carbon.

In the alkaline secondary cell of the invention, the positive electrode active material coated with the soft carbon is made composite. Also in the alkaline secondary cell of the invention, the soft carbon is contained in an amount of 2 to 5 wt % relative to 100 wt % of the sum of the positive electrode active material and the soft carbon.

In the alkaline secondary cell of the invention, the hydrogen gas has a pressure from 0.2 to 278 MPa. Also in the alkaline secondary cell of the invention, the positive electrode contains no cobalt compound as the conductive agent.

In the alkaline secondary cell of the invention, the separator is formed of a polyolefin nonwoven fabric subjected to fluorine gas treatment. Also in the alkaline secondary cell of the invention, the separator is formed of a polyolefin nonwoven fabric applied with a metal oxide.

With this configuration, the separator, which is formed of a polyolefin nonwoven fabric subjected to hydrophilic treatment, is resistant to hydrogen.

In the alkaline secondary cell of the invention, the metal oxide includes at least zirconia and yttrium oxide. Also in the alkaline secondary cell of the invention, the negative electrode and the positive electrode each contain polytetrafluoroethylene as a binder.

Advantageous Effects of Invention

According to the alkaline secondary cell of the invention, the electrode surfaces of the positive and negative electrodes are in contact with the hydrogen gas sealed inside the alkaline secondary cell. Oxygen generated from the positive electrode is bound to the hydrogen gas sealed inside the alkaline secondary cell. Therefore, both the conductive agent in the positive electrode and the hydrogen storage alloy in the negative electrode have no possibility of oxidation. Since the conductive agent and the hydrogen storage alloy are not degraded by oxidation, the alkaline secondary cell has an excellent cycle life characteristic.

In addition, since the carbon material is resistant to oxidation, the conductivity thereof is less prone to being lowered. This inhibits the shortening of the cycle life of the alkaline secondary cell of the invention even when the alkaline secondary cell is overcharged.

In a conventional alkaline secondary cell, overcharge causes elution of a conductive agent. In the alkaline secondary cell of the invention, on the other hand, the positive electrode contains the carbon-based conductive agent. This therefore prevents the conductive agent from eluting in an electrolyte even in overdischarging and inhibits the shortening of the cycle life of the alkaline secondary cell.

The separator of the alkaline secondary cell is less prone to being reduced even in a hydrogen atmosphere and possesses a hydrophilic property. Therefore, the separator can be used for a long period of time. The binder for use in fabricating the electrodes is also less prone to being reduced by hydrogen. Therefore, the electrodes can also be used for a long period of time.

DESCRIPTION OF EMBODIMENTS

The invention will be described in detail based on the following embodiments; however, the invention is not limited to these embodiments.

[Positive Electrode]
<Positive Electrode Material>

A positive electrode material is not particularly limited so long as to be usable for a positive electrode of an alkaline secondary cell, and examples thereof may include a nickel hydroxide-based positive electrode material and a silver oxide-based positive electrode material. More specifically, the positive electrode material may be nickel hydroxide or manganese dioxide. The positive electrode active material is preferably of high bulk density, for example, is preferably of a spherical shape so as to easily achieve an increase in capacity.

A positive electrode of an alkaline secondary cell may be fabricated in such a manner that a current collector is coated with a positive electrode material to be described in each of the following examples. A conductive agent is contained in the positive electrode in a range of preferably 1 to 25 wt %, more preferably 3 to 15 wt % relative to 100 wt % of the sum of the positive electrode active material, a binder, and the conductive agent.

<Positive Electrode Conductive Agent>

1. Positive Electrode Conductive Agent 1 (Positive Electrode Example 1)

A conductive agent imparts conductivity to an active material to increase the utilization of the active material. A conductive agent of this example preferably includes a carbon material that is less prone to being reduced by hydrogen without eluting in an electrolyte in discharging.

Examples of the carbon material may include graphite and amorphous carbon. The amorphous carbon refers to a concept including, for example, carbon black, soft carbon, hard carbon, activated carbon, a carbon nanotube (CNT), and a vapor growth carbon fiber (VGCF). Examples of the carbon black may include furnace black, acetylene black (AB), and ketjen black (KB). The soft carbon is also referred to as high crystalline carbon whereas the hard carbon is also referred to as low crystalline carbon. The conductive agent includes a particulate carbon material as an essential component.

The use of the carbon material as the positive electrode conductive agent under a hydrogen atmosphere at a predetermined pressure or more effectively inhibits the degradation by oxidation of the carbon material. This achieves prolonged cell life unlike a conventional alkaline secondary cell in which a carbon material has been degraded by oxidation.

Of the above carbon materials, amorphous carbon is preferably used from the viewpoints of resistance to an electrolyte and oxidation resistance in charging. In particular, soft carbon is preferably used. Herein, the soft carbon refers to "carbon that turns into a graphite crystal by treatment for graphitization". In other words, the soft carbon refers to carbon having a graphite structure, that is, a structure of regularly laminated hexagonal network planes constituted of carbon atoms, which is easily developed when being subjected to heat treatment in an inert atmosphere. The soft carbon is also referred to as easily graphitizable carbon. The graphite refers to carbon obtained by graphitizing the soft carbon.

On the other hand, the hard carbon refers to carbon that does not turn into a graphite crystal even when being subjected to treatment for graphitization (e.g., high-temperature heat treatment). In other words, the hard carbon refers to carbon having an irregular structure, that is, carbon in which the development of the graphite structure is inhibited. The hard carbon is also referred to as hardly graphitizable carbon.

With regard to the soft carbon, the use of partly graphitized carbon is preferred. In particular, the use of soft carbon having a graphitized surface is preferred. Soft carbon, which is excessively graphitized, is easily degraded. On the other hand, soft carbon, which is not graphitized so much, does not contribute to improvement in conductivity. The ratio of graphitization is preferably 10 to 90 wt %, more preferably 20 to 60 wt % relative to 100 wt % of the entire soft carbon.

Of the various carbon materials, the use of amorphous carbon, particularly, soft carbon leads to further improvement in cell life characteristic. Preferable soft carbon exhibits a specific degree of graphitization, that is, a degree of graphitization (G value) from 0.3 or more to 0.8 to less, preferably from 0.4 or more to 0.7 or less analyzed by Raman spectroscopy.

The soft carbon may be obtained in such a manner that, for example, a soft carbon precursor is subjected to heat treatment under a nonoxidizable gas atmosphere. The heat treatment is preferably carried out at 1000° C. or more to 2800° C. or less. A granulated carbon material is preferably used for increasing the bulk density of a carbon material. The granulation method may be mechanical milling to be described later. Other examples of the granulation method may include, but not limited to, tumbling granulation, fluidized bed granulation, stirring granulation, and compression granulation.

Examples of the soft carbon precursor may include, but not limited to, coal-based heavy oils or petroleum-based heavy oils such as tar and pitch. The soft carbon precursor is fired at 1500 to 2800° C., preferably 2000 to 2600° C. At a firing temperature of less than 500° C., the soft carbon precursor is not easily carbonated, making it difficult to obtain the soft carbon. At a firing temperature ranging from 500° C. or more to less than 1500° C., the resultant soft carbon has low conductivity which is unsatisfactory to serve as a conductive agent, and therefore is short of an output characteristic. With an increase in firing temperature, on the other hand, the soft carbon is gradually graphitized around 2800° C. Graphite is apt to be degraded by oxidation through repetitive charge and discharge. For this reason, overcharge and quick charge tend to cause the shortening of cell life.

The soft carbon obtained at a firing temperature from 1500 to 2800° C. does not cause the above disadvantages, and therefore serves as a conductive agent with a suitable life characteristic and output characteristic. A firing temperature from 2000 to 2600° C. contributes to further improvement in output characteristic.

The time for the heat treatment is preferably 3 hours or more.

The nonoxidizable gas atmosphere refers to an atmosphere of gas with oxygen in considerably small amounts. For example, the nonoxidizable gas atmosphere refers to a vacuum or an atmosphere of inert gas (e.g., nitrogen, helium, neon, argon, hydrogen, carbon dioxide, or a mixed gas thereof).

The particulate carbon material used herein preferably has a mean diameter from 20 nm or more to 100 nm or less. The particulate carbon material with a mean diameter of less than 20 nm is susceptible to damage in heat treatment. Consequently, an intended particulate carbon material may not be obtained. On the contrary, in case the particulate carbon material has a mean diameter of more than 100 nm, it may be difficult to lower a resistance value of an electrode even when being added to an active material by the same amount as those of other particulate carbon materials.

The conductive agent of this example may also include, as an auxiliary component, a fibrous or flake carbon material with a high aspect ratio, in addition to the above particulate carbon material. If the conductive agent includes the carbon material with a high aspect ratio, a ratio of the carbon material in the conductive agent is preferably limited to 20 wt % or less.

A positive electrode containing the carbon material of Positive Electrode Example 1 thus realizes an alkaline secondary cell with an excellent cycle life characteristic.

2. Positive Electrode Conductive Agent 2: Soft Carbon-Coated Conductive Agent (Positive Electrode Example 2)

A carbon material of Positive Electrode Example 2 is obtained in such a manner that a soft carbon coating is formed on a surface of a conductive material by heat treatment.

The conductive material to be coated may be a metal that easily elutes in an electrolyte, a compound, and a carbon material, in addition to the carbon materials of Positive Electrode Example 1. Examples of the conductive material may include, but not limited to, graphite, furnace black, acetylene black (AB), ketjen black (KB), soft carbon, hard carbon, activated carbon, a carbon nanotube (CNT), a vapor growth carbon fiber (VGCF), copper, nickel, iron, gold, platinum, conductive ceramic, and a conductive polymer. In particular, a preferable material to be used herein is higher in conductivity than soft carbon, and examples thereof may include graphite, furnace black, AB, KB, a CNT, a VGCF, copper, nickel, iron, gold, and platinum.

The heat treatment employed herein involves, for example, coating the conductive material with a soft carbon precursor and maintaining the resultant conductive material under a nonoxidizable gas atmosphere at 1500 to 2800° C. for 0.1 to 10 hours. The heat treatment carried out at less than 1500° C. might bring about an unsatisfactory effect of improving conductivity by the soft carbon. On the other hand, the heat treatment carried out at more than 2800° C. requires a large-scale device, resulting in an increase in cost.

In addition, the heat treatment causes the coating to be graphitized, so that the coating is easily degraded by oxidation. The heat treatment carried out for less than 0.1 hours is sometimes difficult to obtain a uniform soft carbon coating. On the other hand, the heat treatment carried out for more than 10 hours requires long-term operation of a heat source, sometimes resulting in an increase in cost.

The atmosphere for the heat treatment may be a nonoxidizable gas atmosphere, that is, a vacuum or an atmosphere of nitrogen, helium, neon, argon, hydrogen, carbon dioxide, or a mixed gas thereof.

The coating method employed herein may be an existing method such as sputtering, fluidized bed coating, spray coating, rotary kiln coating, or dipping. If soft carbon is lower in mechanical strength than an object to be coated, both the object to be coated and the soft carbon are subjected to mechanical milling, so that a particulate surface of the object to be coated is coated with the soft carbon. A composite of the object to be coated can thus be formed. The mechanical milling is carried out at a gravitational acceleration of preferably 5 to 100G, more preferably 10 to 50G. Depending on the mechanical strength of the object to be coated, at a gravitational acceleration of less than 10 G, the particulate surface of the object to be coated is difficult to be coated with the soft carbon, resulting in poor oxidation resistance. At a gravitational acceleration of more than 100 G, on the other hand, the object to be coated is pulverized together with the soft carbon, so that the object to be coated might be exposed from the particulate surface of the composite.

The mechanical milling is preferably carried out in the nonoxidizable gas atmosphere rather than an air atmosphere. Under the nonoxidizable gas atmosphere, the self-lubricity of the carbon material can be inhibited. Therefore, the carbon material, particularly, the soft carbon is favorably pulverized. The composite is thus easily obtained, in which the particulate surface of the object to be coated is coated with the carbon material. The nonoxidizable gas atmosphere is more preferably a reduction atmosphere where, for example, hydrogen gas is sealed.

The mechanical milling is a process capable of applying external force, such as impaction force, tensile force, frictional force, compression force, or shearing force, to raw material powder (at least the positive electrode material and the soft carbon). Examples of the mechanical milling may include processes using a tumbling mill, a vibration mill, a planetary mill, an oscillation mill, a horizontal mill, an attritor mill, a jet mill, a mortar machine, a homogenizer, a fluidizer, a paint shaker, and a mixer.

According to the process using the planetary mill, for example, raw material powder is put into a container together with a ball. The raw material powder can thus be pulverized and mixed or reacted in a solid state, by dynamic energy generated by the rotation and revolution of the container.

The object to be coated is lower in mechanical strength and higher in conductivity than the soft carbon, and examples of a material for the object to be coated may include, but not limited to, graphite, hard carbon, activated carbon, a carbon nanotube (CNT), a vapor growth carbon fiber (VGCF), copper, nickel, iron, gold, and platinum.

In the soft carbon-coated conductive agent thus prepared, the soft carbon coating has oxidation resistance and the coated object has high conductivity. Therefore, the soft carbon-coated conductive agent produces an effect of improving the conductivity of a positive electrode.

A thickness of the soft carbon coating is not particularly limited, but preferably ranges from 10 nm or more to 1000 nm since the thickness varies due to air bubbles entrained at the timing of coating or heat treatment. The soft carbon coating of less than 10 nm in thickness produces unsatisfactory improvement in oxidation resistance, the conductivity of the conductive agent tends to be uniform, and current concentration is apt to occur in charging and discharging. As a result, it may be difficult to improve a high rate charge-discharge characteristic. On the other hand, the soft carbon coating of more than 1000 nm in thickness might cause a reduction in electrode capacity density.

A coverage of the soft carbon coating needs to be 0.1 to 30 mass % relative to 100 mass % of the soft carbon-coated conductive agent. A coverage of less than 0.1 mass % produces unsatisfactory improvement in oxidation resistance, the conductivity of the conductive agent tends to be uniform, and current concentration is apt to occur in charging and discharging. As a result, it may be difficult to improve a high rate charge-discharge characteristic. On the other hand, a coverage of more than 10 mass % disadvantageously causes a reduction in electrode capacity density. The coverage has a lower limit of preferably 0.2 mass %, more preferably 0.5 mass %. The coverage also has an upper limit of preferably 10 mass %, more preferably 5 mass %.

The use of the soft carbon-coated conductive agent contributes to further improvement in cell life characteristic. The preferable soft carbon exhibits a specific degree of graphitization, that is, a degree of graphitization (G value) from 0.3 or more to 0.8 or less, preferably from 0.4 or more to 0.7 or less analyzed by Raman spectroscopy.

With the carbon material of Positive Electrode Example 2, a metal apt to elute and a carbon material apt to be oxidized can be used as the positive electrode material. This achieves mutual complementation between a metal that conducts electricity well but is apt to elute in an electrolyte and a carbon material that is higher in electrical resistance than a metal.

3. Soft Carbon-Coated Positive Electrode Material (Positive Electrode Example 3)

A positive electrode material of Positive Electrode Example 3 is obtained by compositing the conductive agent of Positive Electrode Example 1 or by compositing the conductive agent of Positive Electrode Example 2.

The positive electrode material is obtained in such a manner that powder of a carbon material-coated positive electrode active material is made composite. However, since the positive electrode active material is decomposed at 230° C. or more, heat treatment cannot be carried out for forming a soft carbon coating on a surface of the positive electrode active material. In this example, therefore, a key point is to obtain the positive electrode material by forming the soft carbon coating on the surface of the positive electrode active material without heat treatment.

Specifically, a positive electrode active material and soft carbon are subjected to mechanical milling, so that a particulate surface of the positive electrode active material is coated with the soft carbon. A soft carbon-positive electrode active material composite is thus formed. The mechanical milling is carried out at a gravitational acceleration of preferably 1 to 50 G, more preferably 5 to 30 G. At a gravitational acceleration of less than 1 G, the particulate surface of the positive electrode active material is difficult to be coated with the soft carbon, resulting in poor life characteristic. At a gravitational acceleration of more than 50 G, on the other hand, the positive electrode active material is apt to be pulverized and might be exposed from the particulate surface of the composite, also resulting in poor output characteristic. The positive electrode active material is, for example, nickel hydroxide or manganese dioxide.

The mechanical milling is a process capable of applying external force, such as impaction force, tensile force, frictional force, compression force, or shearing force, to raw material powder (at least the positive electrode active material and the soft carbon), and examples thereof may include the processes in Positive Electrode Example 2.

In Positive Electrode Example 3, a positive electrode contains at least the positive electrode active material and the conductive agent. The conductive agent, that is, the soft carbon is lower in mechanical strength than the positive electrode active material and therefore is apt to be pulverized as compared with the positive electrode active material. For this reason, the fine soft carbon powder is press fitted to the surface of the positive electrode active material powder by, for example, a ball. The positive electrode active material can thus be coated with the soft carbon.

The soft carbon for coating the surface of the positive electrode material powder including the positive electrode active material is obtained by a similar method to that in Positive Electrode Example 1. The preferable soft carbon exhibits a specific degree of graphitization, that is, a degree of graphitization (G value) from 0.3 or more to 0.8 or less, preferably from 0.4 or more to 0.7 or less analyzed by Raman spectroscopy.

The use of the composite positive electrode material of Positive Electrode Example 3 contributes to improvement in output characteristic of an alkaline secondary cell, as compared with a positive electrode in which a conductive agent and the like are mixed in a dispersed state independently of one another.

<Positive Electrode Binder>

Examples of the binder may include sodium polyacrylate, methyl cellulose, carboxymethyl cellulose (CMC), polyvinyl alcohol (PVA), polyvinyl butyral (PVB), ethylene-vinylalcohol, an ethylene-vinylacetate (EVA) copolymer, polyethylene (PE), polypropylene (PP), a fluororesin, and a styrene-ethylene-butylene-styrene (SEBS) copolymer.

The binder may also be polytetrafluoroethylene (PTFE). PTFE is less prone to being reduced by hydrogen and is also less prone to being degraded even when being used for a long period of time in a hydrogen atmosphere. Therefore, the use of PTFE is expected to contribute to the prolonging of life. Specifically, powdery PTFE is dispersed in water and then is stirred by the application of shearing stress to prepare a water emulsion. The resultant water emulsion is blended into a positive electrode material and a conductive agent.

A weight ratio of the binder contained in a positive electrode is preferably 20 wt % or less, more preferably 10 wt % or less, still more preferably 5 wt % or less relative to 100 wt % of the sum of the positive electrode material, the binder, and the conductive agent. The binder is of poor electron conductivity and poor ion conductivity. The weight ratio of more than 20 wt % makes difficult to achieve an increase in capacity.

The positive electrode of the alkaline secondary cell of this embodiment may contain a component other than the above essential components within a scope that does not depart from the objective of the invention as necessary. The positive electrode of the alkaline secondary cell of this embodiment may be obtained as follows. For example, the positive electrode material and the conductive agent are satisfactorily and uniformly mixed together and this mixture is kneaded into a paste with the binder added thereto.

<Positive Electrode Current Collector>

A current collector is not particularly limited so long as to have electron conductivity and to electrify a retained negative electrode material. Examples of the material may include conductive substances such as C, Fe, Ti, Cr, Ni, Mo, Ta, W, Pt, and Au, and an alloy (e.g., stainless steel) of at least two of the conductive substances. The current collector is preferably made of Ni that has high electric conductivity, favorable stability in an electrolyte, and good oxidation resistance. The current collector may also be made of nickel-coated iron.

The current collector for the positive electrode is preferably coated with carbon on its surface. The carbon layer, which is previously formed on the surface of the current collector, contributes to improvement in oxidation resistance of the current collector. A preferable carbon layer exhibits good adhesion of an active material layer to a current collector and has conductivity. Such a carbon layer may be formed in such a manner that, for example, a binder mixed with a carbon-based conductive agent is applied onto or sprayed onto a current collector in a thickness from 0.1 to 50 µm or the current collector is immersed in the binder.

The conductive agent for the carbon layer is preferably soft carbon powder. A metal-based conductive agent is oxidized in overcharging or quick charging, so that a conductive network in an electrode is susceptible to damage, resulting in poor input and output characteristic. Examples of the carbon-based conductive agent may include the carbon materials of Positive Electrode Example 1 and the carbon materials of Positive Electrode Example 2. These carbon materials may be used alone or in combination. The soft carbon for coating the surface of the current collector may be prepared by a similar method to that in Positive Electrode Example 1. Preferable soft carbon exhibits a specific degree of graphitization, that is, a degree of graphitization (G value) from 0.3 or more to 0.8 or less, preferably from 0.4 or more to 0.7 or less analyzed by Raman spectroscopy.

A binder for the carbon layer formed on the current collector is not particularly limited so long as to be bound-able to the carbon-based conductive agent. However, if the carbon layer is formed of a water-soluble material such as PVA, CMC, or sodium alginate, the carbon layer is melted in applying or filling an electrode slurry. The carbon layer frequently fails to remarkably produce its advantageous effects. For this reason, the carbon layer is previously crosslinked in using such an aqueous binder. Examples of a crosslinker may include, but not limited to, a zirconia compound, a boron compound, and a titanium compound. The crosslinker may be added by 0.1 to 20 mass % relative to an amount of the binder in forming the slurry for the carbon layer.

The carbon layer thus prepared is less susceptible to polarization even in overcharging or quick charging, which contributes to improvement in high rate charge-discharge characteristic.

The current collector may be in a linear form, a rod form, a plate form, a foil form, a mesh form, a woven fabric form, a nonwoven fabric form, an expanded form, a porous form, an embossed form, or a foamed form. In particular, the current collector is preferably in an embossed form or a foamed form that enhances a packing density and leads to a favorable output characteristic.

For example, the current collector may be formed of a two-dimensional substrate such as a perforated metal, an expanded metal, or a wire mesh. The current collector may alternatively be formed of a three-dimensional substrate such as a foamed nickel substrate, a mesh-like sintered fabric substrate, or a nickel-plated substrate which is a metal-plated nonwoven fabric.

The use of the above current collector for the positive electrode of the alkaline secondary cell allows the positive electrode material to have a conductive network, which is apt to lead to an increase in capacity.

The positive electrode material powder, the binder, and the conductive powder are mixed and kneaded into a paste. The paste is applied to the current collector or the current collector is filled with the paste. The resultant current collector is dried and then is subjected to rolling using a roller press or the like. The positive electrode is thus fabricated.

[Negative Electrode]
<Hydrogen Storage Alloy>

A hydrogen storage alloy as a negative electrode material is not particularly limited so long as to store and release hydrogen. Examples of the hydrogen storage allow may include, but not limited to, an AB5 rare earth alloy, an AB2 Laves phase alloy, an AB titanium-zirconium alloy, and an A2B magnesium alloy.

In particular, the hydrogen storage alloy is preferably an AB5 rare earth-nickel alloy, that is, a quinary alloy containing MmNiCoMnAl misch metal from the viewpoints of a hydrogen storage capacity, a charge-discharge characteristic, a self-discharge characteristic, and a cycle life characteristic. The hydrogen storage alloy is also preferably a so-called superlattice hydrogen storage alloy, that is, a LaMgNi alloy. These alloys may be used alone or in combination.

<Negative Electrode Conductive Agent>

A preferable conductive agent is conductive powder. Examples of the conductive agent may include graphite powder, powder of a carbon material such as acetylene black or ketjen black, and powder of a metal such as nickel or copper. A weight ratio of the conductive agent in the negative electrode is preferably 0.1 to 10 wt % relative to 100 wt % of the sum of the hydrogen storage alloy powder, a binder, and the conductive agent.

The hydrogen storage alloy powder, the binder, and the conductive powder are mixed and kneaded into a paste. The paste is applied to a current collector or the current collector is filled with the paste. The resultant current collector is dried and then is subjected to rolling using a roller press or the like. A negative electrode is thus fabricated.

<Negative Electrode Binder>

Examples of the binder may include sodium polyacrylate, methyl cellulose, carboxymethyl cellulose (CMC), polyvinyl alcohol (PVA), polyvinyl butyral (PVB), ethylene-vinylalcohol, an ethylene-vinylacetate (EVA) copolymer, polyethylene (PE), polypropylene (PP), a fluororesin, a styrene-ethylene-butylene-styrene (SEBS) copolymer, styrene-butadiene rubber (SBR), nylon, and xanthan gum.

Similar to the positive electrode, the binder may also be polytetrafluoroethylene (PTFE). The use of PTFE is expected to contribute to the prolonging of life even in a hydrogen atmosphere.

A weight ratio of the binder in the negative electrode is preferably 20 wt % or less, more preferably 10 wt % or less, still more preferably 5 wt % or less relative to 100 wt % of the stun of the negative electrode material powder (hydrogen storage alloy), the binder, and the conductive agent. The weight ratio of more than 20 wt % makes difficult to achieve an increase in capacity.

The negative electrode of the alkaline secondary cell of this embodiment may contain a component other than the above essential components within a scope that does not depart from the objective of the invention as necessary.

The negative electrode of the alkaline secondary cell of this embodiment is typically fabricated by mixing the above components in a predetermined ratio. For example, the negative electrode material and the conductive agent are satisfactorily and uniformly mixed together and this mixture is kneaded into a paste with the binder added thereto.

<Negative Electrode Current Collector>

A current collector is not particularly limited so long as to have electron conductivity and to electrify a retained negative electrode material. Examples of the material may include conductive substances such as C, Fe, Ti, Cr, Ni, Cu, Mo, Ta, W, Pt, and Au, and an alloy (e.g., stainless steel) of at least two of the conductive substances. The current collector is preferably made of Ni that has high electric conductivity, favorable stability in an electrolyte, and good oxidation resistance. The current collector may also be made of nickel- or carbon-coated iron.

The current collector for the negative electrode may be in a linear form, a rod form, a plate form, a foil form, a mesh form, a woven fabric form, a nonwoven fabric form, an expanded form, a porous form, an embossed form, or a foamed form. In particular, the current collector is preferably in an embossed form or a foamed form that enhances a packing density and leads to a favorable output characteristic.

For example, the current collector may be formed of a two-dimensional substrate such as a perforated metal, an expanded metal, or a wire mesh. The current collector may alternatively be formed of a three-dimensional substrate such as a foamed nickel substrate, a mesh-like sintered fabric substrate, or a nickel-plated substrate which is a metal-plated nonwoven fabric.

The use of the above current collector for the negative electrode of the alkaline secondary cell allows the negative electrode material to have a conductive network, which is apt to lead to an increase in capacity.

The negative electrode material powder, the binder, and the conductive powder are mixed to prepare a paste. The paste is applied to the current collector or the current collector is filled with the paste. The resultant current collector is dried and then is subjected to rolling using a roller press or the like. The negative electrode is thus fabricated.

[Electrolyte]

An electrolyte is not particularly limited so long as to be used for a cell in which an active material is hydrogen. For example, a favorable electrolyte is an aqueous solution of a salt such as potassium hydroxide (KOH), lithium hydroxide (LiOH), or sodium hydroxide (NaOH). The electrolyte is preferably an aqueous potassium hydroxide solution from the viewpoint of a cell output characteristic.

Other examples of the electrolyte may include a nonaqueous solvent, a solid-state electrolyte, a gel electrolyte, and an ionic liquid, in addition to the above aqueous solvent.

[Separator]

A separator to be used herein may be a well-known separator for a cell in which an active material is hydrogen. The separator may be formed of a micro-porous film, a woven fabric, a nonwoven fabric, or a powder compact. In particular, a nonwoven fabric is preferred from the viewpoints of an output characteristic and a fabrication cost. The separator is made of a material which is not particularly limited, but preferably has alkali resistance, oxidation resistance, and reduction resistance. Specifically, the separator is preferably made of a polyolefin fiber such as polypropylene or polyethylene. Other examples of the material may include, but not limited to, polytetrafluoroethylene (PTFE), polyimide (PI), polyamide, polyamide-imide, and aramid. The separator may alternatively be coated with ceramic to improve heat resistance, a lyophilic property, and gas permeability.

A polyolefin fiber, which has a hydrophobic property, needs to be subjected to hydrophilic treatment. The separator to be used in a hydrogen gas atmosphere is preferably subjected to fluorine gas treatment. The separator is also preferred in a state in which a metal oxide is applied to a surface thereof or the surface is coated with the metal oxide.

The fluorine gas treatment or the application of metal oxide imparts a hydrophilic property to the separator which is less prone to lose its hydrophilic property due to hydrogen even in a hydrogen gas atmosphere. Therefore, the use of the separator is expected to contribute to the prolonging of life.

According to the fluorine gas treatment, for example, a nonwoven fabric is exposed to fluorine gas diluted with inert gas, in a hermetic space, so that a fibrous surface of the nonwoven fabric can be made hydrophilic. Examples of the metal oxide may include, but not limited to, titanium oxide, zirconium oxide, yttrium oxide, hafnium oxide, calcium oxide, manganese oxide, and scandium oxide. The metal oxide is preferably zirconia ($ZrO_2$) or yttrium oxide ($Y_2O_3$). The metal oxide has the hydrophilic property and holds the hydrophilic property for a long period of time since it is less prone to being degraded by hydrogen. Therefore, the metal oxide reduces the dry-out of an electrolyte.

[Cells]

<Spiral-Wound Cell>

Figure 1:
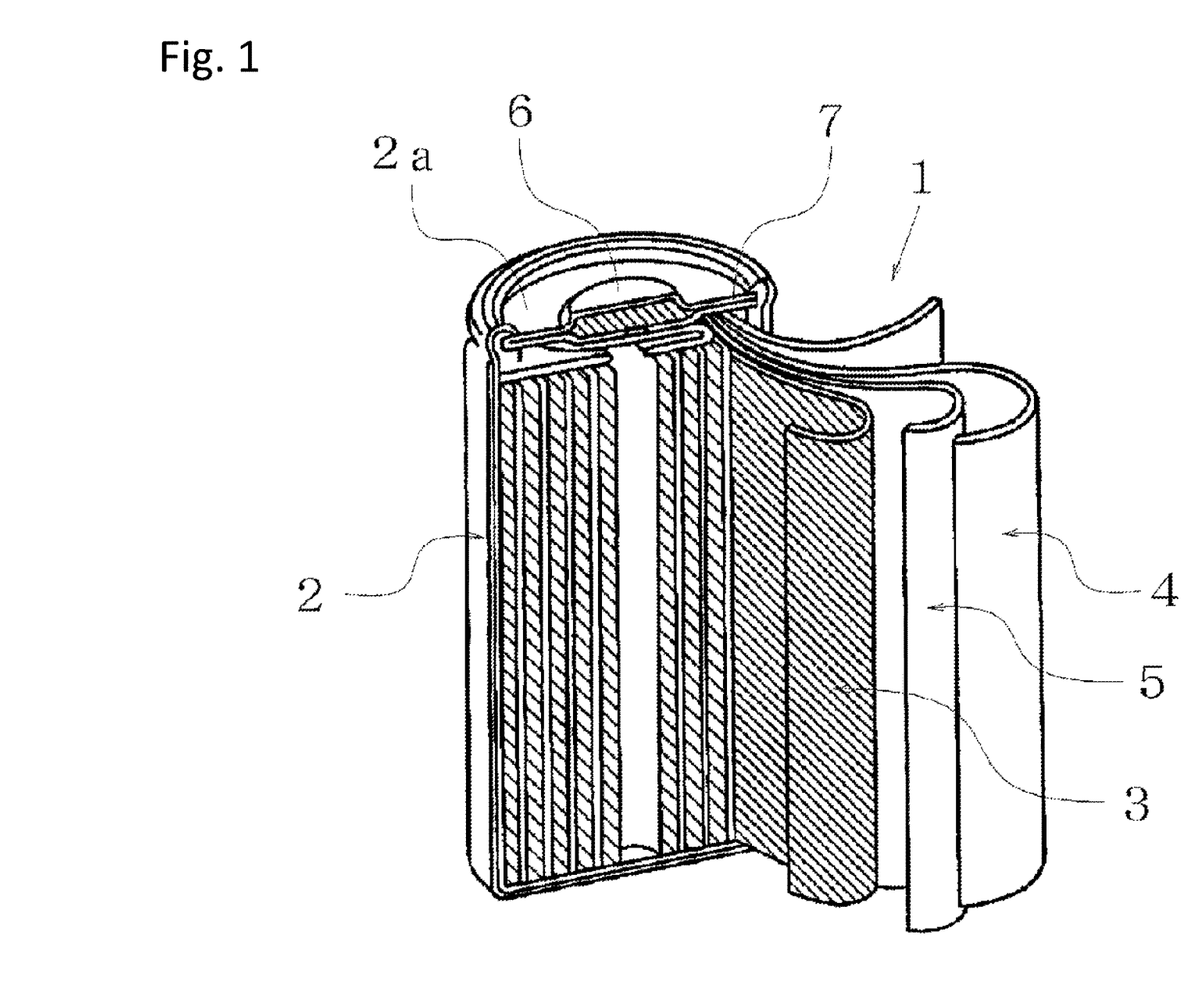
FIG. 1 is a partly cutaway perspective view of a spiral-wound cell.

A spiral-wound cell 1 illustrated in FIG. 1 principally includes a positive electrode 3, a negative electrode 4, a separator 5, and an electrolyte each disposed in a cell case 2. The cell case 2 is a substantially cylindrical container and has an opening 2a formed in an upper side thereof and a negative electrode terminal formed on a lower side thereof. The positive electrode 3 and the negative electrode 4, each of which has a strip shape, are wound in a spiral with the separator 5 interposed therebetween in the cell case 2. The opening 2a of the cell case 2 is sealed with a sealing plate 7 in a fluid-tight manner with the cell case 2 filled with the electrolyte. A cap 6 on an upper surface of the sealing plate 7 serves as a positive electrode terminal. The positive electrode terminal is connected to the positive electrode 3 via a lead wire (not illustrated).

A positive electrode, a negative electrode, and separators are arranged in order of the separator, negative electrode, separator, and positive electrode, and are wound about one end of the innermost separator in a longitudinal direction. A spiral-wound block is thus prepared. A nickel tab is attached by welding to each of the negative electrode side and positive electrode side of the spiral-wound block, and the spiral-wound block is impregnated with an electrolyte. The spiral-wound block is decompressed for 5 minutes and then is released to atmospheric pressure so as to be impregnated with electrolyte. The spiral-wound block is housed in a cell case which is a pressure-resistant container. A hydrogen gas tank is connected to the cell case to feed hydrogen gas with 4 MPa of pressure into the cell case, and then the cell case is hermetically closed.

<Laminated Cell>

Figure 2:
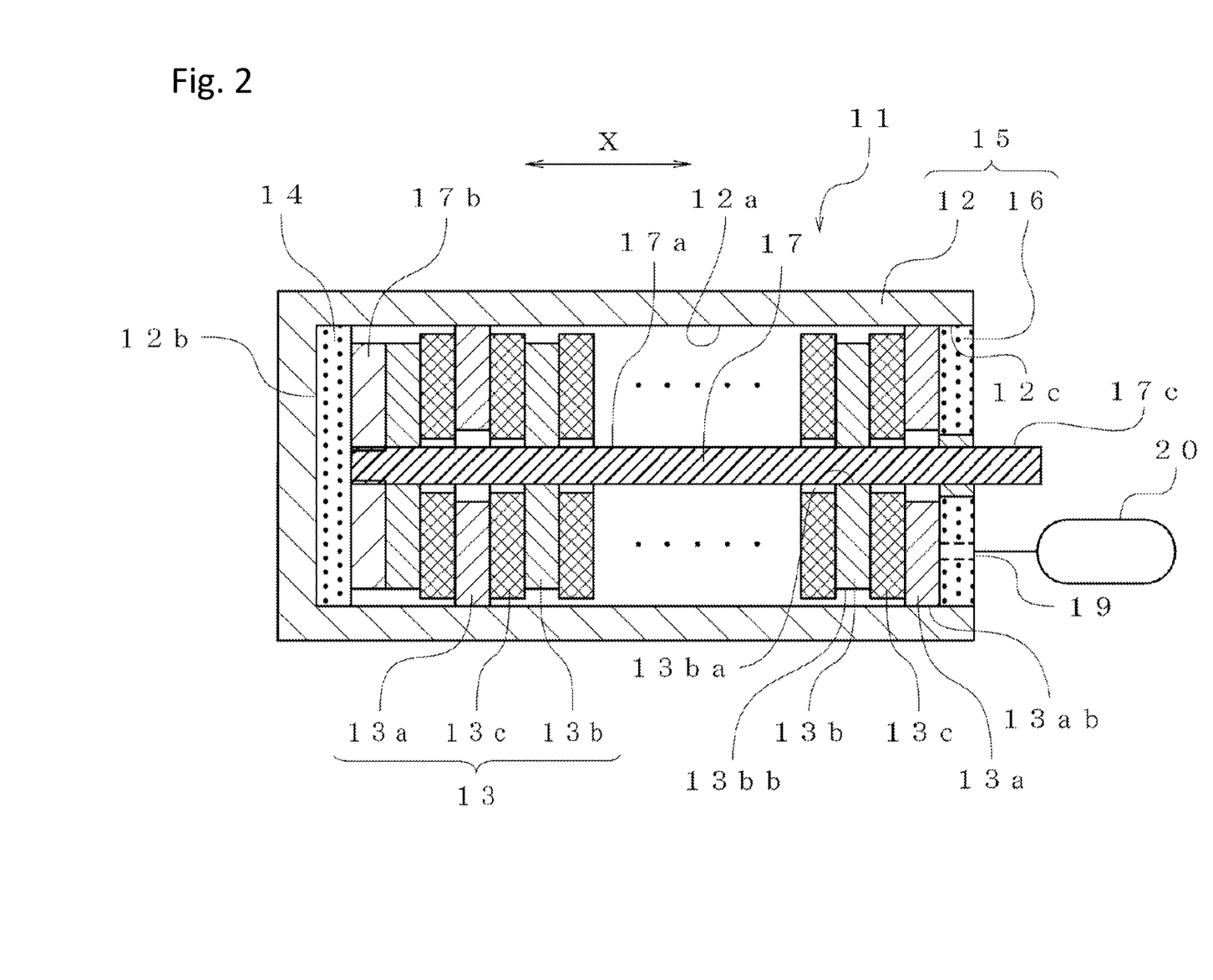
FIG. 2 is an axial sectional view of a laminated cell.

A laminated cell 11 illustrated in FIG. 2 principally includes an outer jacket 15, a current collector rod 17, and an electrode body 13 housed in the outer jacket 15. The outer jacket 15 includes a one end-closed cylindrical can 12 and a disc-like lid member 16 attached to an opening 12c in the cylindrical can 12. The lid member 16 is hermetically fitted in the opening 12c of the cylindrical can 12 in which the electrode body 13 is housed.

The electrode body 13 includes a positive electrode 13a, a negative electrode 13b, and a separator 13c interposed between the positive electrode 13a and the negative electrode 13b. The positive electrode 13a, the negative electrode 13b, and the separator 13c are stacked in an axial direction (i.e., X direction in FIG. 2) of the cylindrical can 12 and are housed in the outer jacket 15. The positive electrode 13a has an outer edge 13ab which is in contact with an inner surface 12a of the cylindrical can 12. The positive electrode 13a is thus electrically connected to the cylindrical can 12. The electrode body 13 has a center through hole through which the current collector rod 17 passes. The hole in the negative electrode 13b has a circumferential edge 13ba which is in contact with a shaft portion 17a of the current collector rod 17. The negative electrode 13b is thus electrically connected to the current collector rod 17. The lid member 16 has a supply port 19 for supplying an electrolyte and hydrogen gas. A hydrogen gas tank 20 is connectable to the supply port 19.

A negative electrode and a positive electrode, which are stacked with an electrolyte-impregnated separator interposed therebetween, are housed in an outer jacket. The outer jacket is then hermetically closed. A cell is thus assembled. The cell thus assembled is evacuated at 80° C. for 1 hour in such a manner that air is purged from the cell. A hydrogen gas tank is then connected to the cell to seal hydrogen gas with 4 MPa of pressure in the cell. The hydrogen gas with 4 MPa of pressure is supplied from the hydrogen gas tank to the cell in such a manner that the cell is evacuated again at 80° C. for 1 hour.

Each of the spiral-wound cell 1 and the laminated cell 11 has no hydrogen storage chamber, leading to a reduction in cell size. The hydrogen gas supplied to each cell is held at a clearance in the cell, rather than a dedicated space such as a hydrogen storage chamber. Examples of such a clearance may include a clearance between the positive electrode and the outer jacket serving as the current collector, a clearance between the negative electrode and the current collector rod serving as the current collector, a clearance between the electrodes, and a clearance between each electrode and the separator. The hydrogen gas may also be held at a void inside each electrode. Particularly, oxygen generated from the positive electrode is immediately bound to the hydrogen gas held at the void in the positive electrode to form water. Therefore, the conductive agent in the positive electrode has no possibility of oxidation. The hydrogen gas is fed to the void in each electrode from the electrode surface. Oxygen leaked out of the positive electrode is bound to the hydrogen gas sealed inside the cell and the hydrogen gas retained in the hydrogen storage alloy. Therefore, the hydrogen storage alloy has no possibility of oxidation.

The pressure of the hydrogen gas to be sealed inside the cell ranges from 0.1 to 278 MPa. A pressure of 278 MPa or more causes an increase in size of the outer jacket which is a pressure-resistant container. On the other hand, a negative pressure causes inconvenience in handling. The pressure of the hydrogen gas preferably ranges from 0.2 to 100 MPa. The pressure may also range from 0.4 to 20 MPa. This range is applicable to a small cell with ease. The amount of the hydrogen gas to be retained in each electrode depends on the pressure of the hydrogen gas and is preferably 8 to 400 g per 22.4 L. The hydrogen gas discussed herein refers to the hydrogen gas which is previously sealed inside the cell from the outside of the cell, rather than the hydrogen gas generated inside the cell by the electrolysis of the electrolyte.

[Test Results]

<Test Result 1>

A positive electrode was fabricated in such a manner that a foamed nickel substrate (Celmet #8 available from Sumitomo Electric Industries) was filled with a slurry of nickel hydroxide with various carbon materials, a polyolefin binder (0.5 wt % Chemipearl available from Mitsui Chemicals), an acrylic acid-based thickener (0.15 wt % SS gel available from Sumitomo Seika Chemicals), and a nonionic surfactant (0.15 wt % Triton X available from Sigma-Aldrich). The positive electrode had a composition of the nickel hydroxide (99.2-X wt %), carbon materials (X wt %), polyolefin binder (0.5 wt %), acrylic acid-based thickener (0.15 wt %), and nonionic surfactant (0.15 wt %), in which the carbon materials X to be added were changed to 0 wt %, 2 wt %, and 3 wt %. As used herein, the carbon materials were acetylene black (AB) and soft carbon (SC) fired at 2300° C. A negative electrode corresponding to a counter electrode was fabricated in such a manner that an AB5 hydrogen storage alloy was applied to a perforated metal substrate. As used herein, a separator was a 130 μm-thick polypropylene nonwoven fabric (available from Japan Vilene) subjected to sulfonating treatment. As used herein, an electrolyte was an aqueous potassium hydroxide solution (6 mol/L) containing 30 g/L lithium hydroxide. A ratio between a negative electrode capacity and a positive electrode capacity (N/P) was adjusted to 2.5. As used herein, a cell container was a pressure-resistant container. Spiral-wound cells with a nominal capacity of 1000 mAh were thus fabricated. Each of the cells was filled with hydrogen gas with 0.4 MPa of pressure, was charged and discharged once at 0.1 CA, 0.2 CA, and 0.5 CA, respectively, and was subjected to aging treatment. Thereafter, each of the cells was subjected to a 1-CA constant-current charge-discharge test for evaluating the life characteristics.

Figure 3:
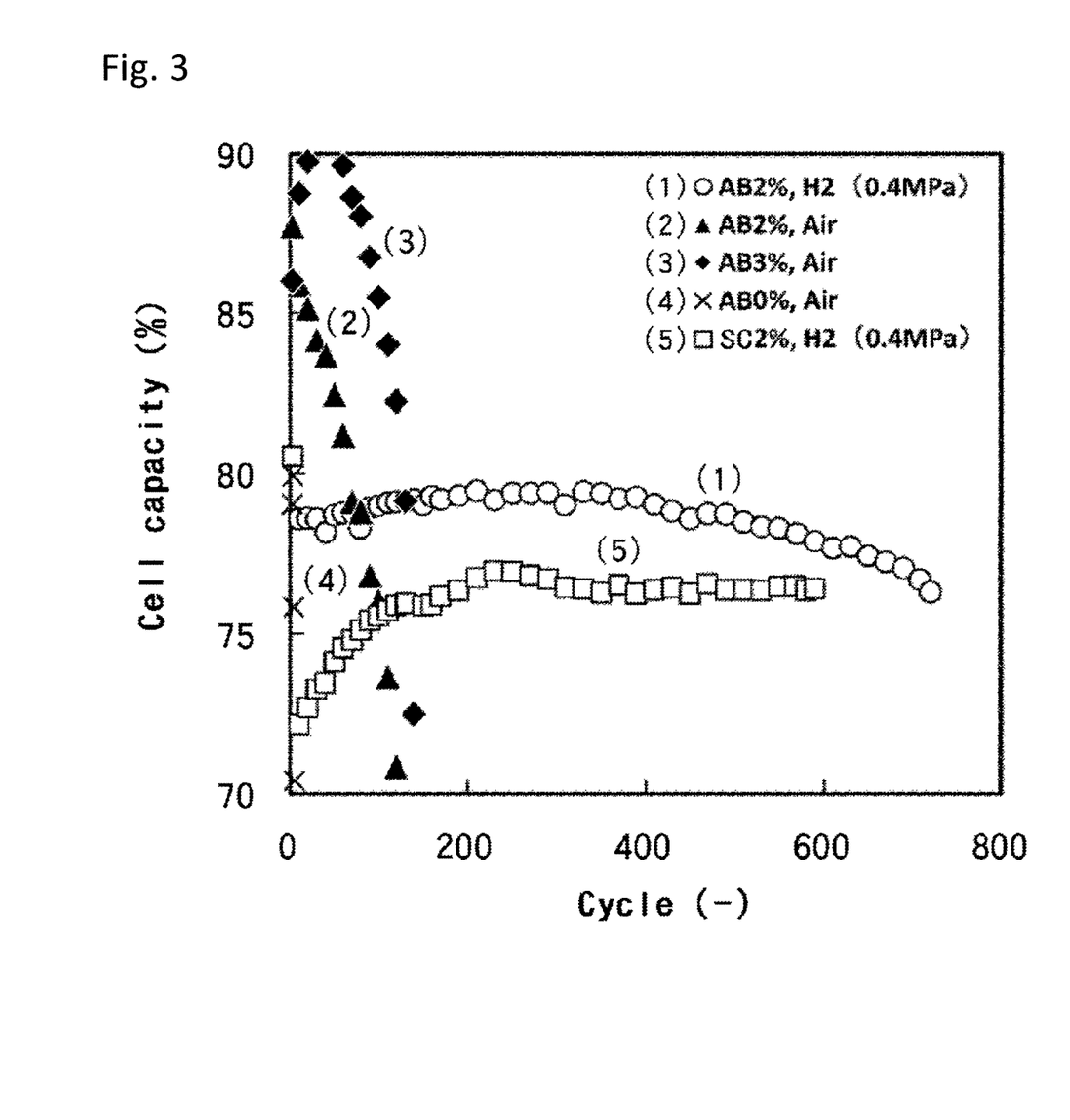
FIG. 3 is a graph of cycle life characteristics of cells.

FIG. 3 is a graph of comparison between the cycle life characteristic of a hydrogen gas-filled cell and the cycle life characteristic of an air-filled cell, based on measurements of the amounts of discharge from the respective cells, with the conductive agents in the respective cells specified as parameters.

In FIG. 3, plots (1) indicate results of a test conducted on a cell, in which a carbon material as a conductive agent is 2 wt % AB, under a hydrogen atmosphere. Plots (2) and (3) indicate results of a test conducted on cells, in which carbon materials as a conductive agent are respectively 2 wt % AB and 3 wt % AB, under an air atmosphere. Plots (4) indicate results of a test conducted on a cell, which contains no conductive agent, in an air atmosphere. Plots (5) indicate results of a test conducted on a cell, in which a conductive agent is soft carbon (SC) fired at 2300° C., in a hydrogen atmosphere.

The cell capacity of each conventional nickel-metal hydride cell filled with no hydrogen gas was lowered through repetitive charge and discharge (see plots (2) to (4)). This is because the repetitive charge and discharge cause degradation by oxidation of a conductive agent in a positive electrode, resulting in lowering of the conductivity of the positive electrode. This is also because oxidation of a hydrogen storage alloy (M) in a negative electrode proceeds by a reaction represented by Formula 4.

Negative electrode: $MH+OH^- \rightarrow MOH+e^-$      [Formula 4]

On the other hand, each of the hydrogen gas-filled cells (see plots (1), (5)) is drastically improved in life characteristic as compared with the air-filled cells. This is because the action of hydrogen filled in the cell inhibits oxidation of a conductive agent in a positive electrode, leading to drastic improvement in cell life characteristic. Moreover, a reaction represented by Formula 5 occurs at a negative electrode. In Formula 5, no oxidation of a hydrogen storage alloy (M) proceeds. In other words, the hydrogen gas sealed inside the cell inhibits lowering of a discharge capacity even after 200 cycles.

Negative electrode: $H_2+2OH^-\rightarrow 2H_2O+2e^-$ [Formula 5]

The hydrogen gas-filled cell in which AB is used as the positive electrode conductive agent (see plots (1)) is gradually degraded after 300 cycles. On the other hand, the hydrogen gas-filled cell in which SC is used as the positive electrode conductive agent (see plots (5)) has no tendency of degradation even after 500 cycles. This demonstrates that carbon for the positive electrode conductive agent is preferably soft carbon rather than acetylene black.

Figure 4:
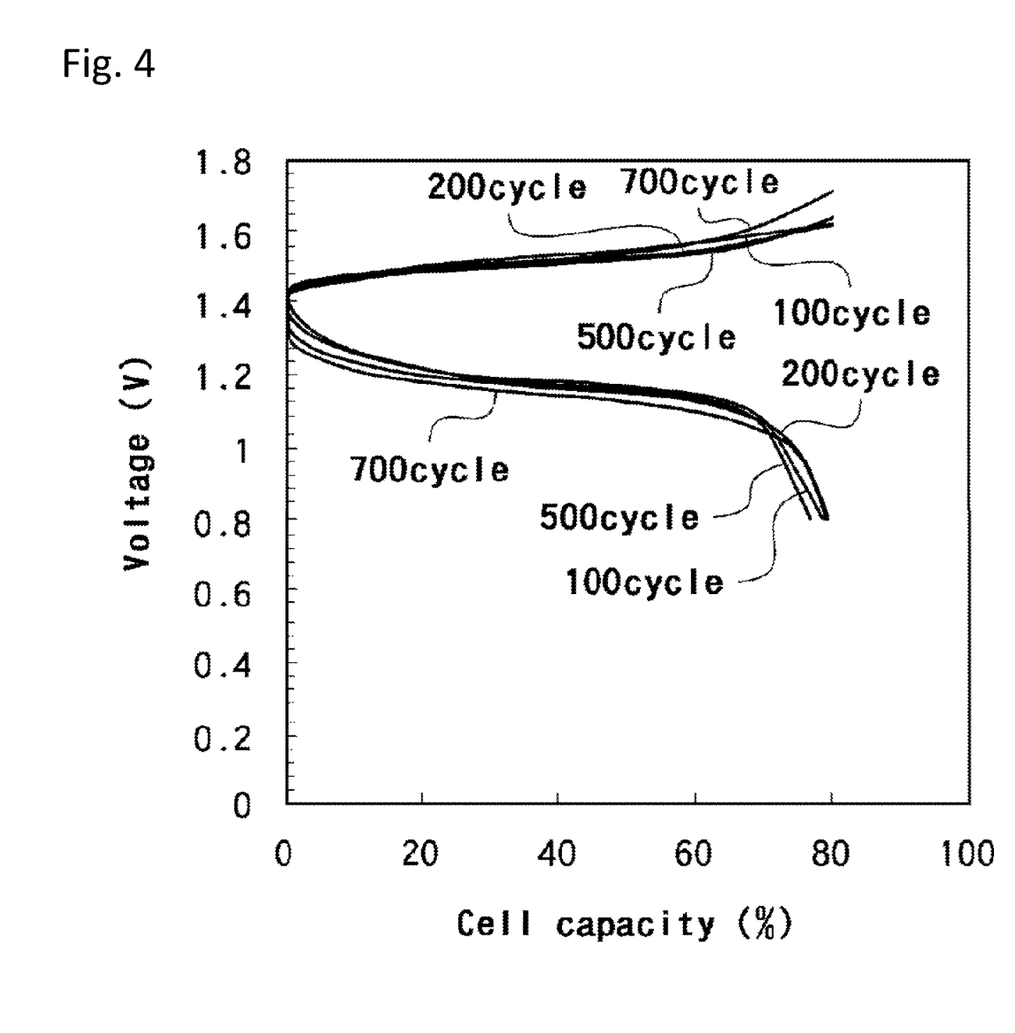
FIG. 4 is a graph of charge-discharge characteristics of a cell in which acetylene black (AB) is used as a conductive agent.
Figure 5:
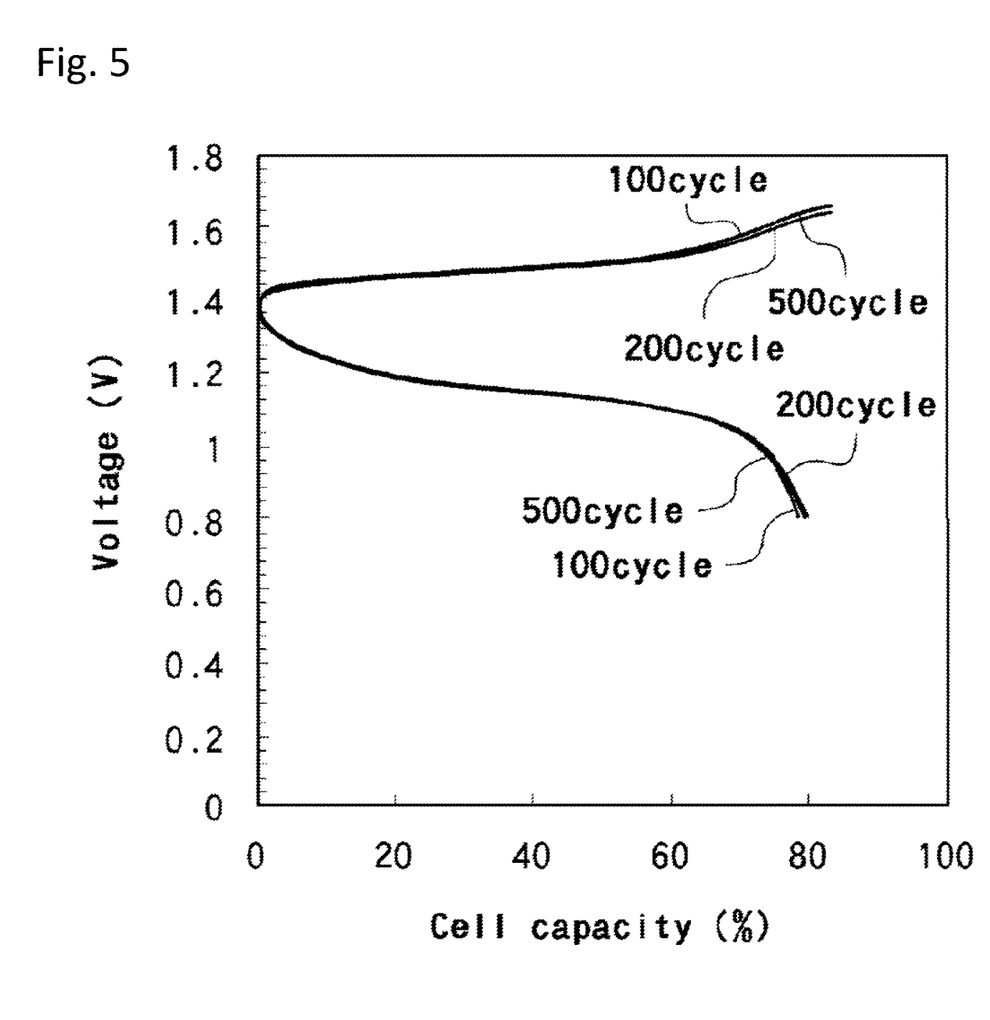
FIG. 5 is a graph of charge-discharge characteristics of a cell in which soft carbon (SC) is used as a conductive agent.

FIG. 4 illustrates charge-discharge curves as to the hydrogen gas-filled cell in which AB is used as the conductive agent. FIG. 5 illustrates charge-discharge curves as to the hydrogen gas-filled cell in which SC is used as the conductive agent. It is apparent from a comparison between FIG. 4 and FIG. 5 that the charge-discharge characteristics in FIG. 4 vary much significantly than the charge-discharge characteristics in FIG. 5.

<Test Result 2> (Studies on Conductive Agents)

Various carbon materials shown in Table 1 were used as a positive electrode conductive agent. In Table 1, a coated conductive agent was obtained by firing a conductive agent with a soft carbon coating formed on a surface thereof. In preparation, the object to be coated was 90 wt % and the coating (soft carbon precursor) was 10 wt % relative to 100 wt % of the sum of the object to be coated and the coating.

TABLE 1

| Conductive agent | Constitution | | Heat treatment condition | | |
|---|---|---|---|---|---|
| | Object to be coated | Coating | Temp. | Time | Atmos. |
| Soft carbon | Coal pitch | None | 2300° C. | 6 h | Ar |
| AB | Acetylene black | None | | None | |
| Soft carbon/AB | Acetylene black | Petroleum pitch | 2300° C. | 6 h | Ar |
| Soft carbon/graphite | Graphite | Petroleum pitch | 2300° C. | 6 h | Ar |

A positive electrode was fabricated using each of the conductive agents so as to have a composition of nickel hydroxide (97.2 wt %), a carbon material (2 wt %), a polyolefin binder (0.5 wt %), an acrylic acid-based thickener (0.15 wt %), and a nonionic surfactant (0.15 wt %). A negative electrode corresponding to a counter electrode was fabricated in such a manner that an AB5 hydrogen storage alloy was applied to a perforated metal substrate. As used herein, a separator was a 130-μm thick polypropylene nonwoven fabric (available from Japan Vilene) subjected to sulfonating treatment. As used herein, an electrolyte was an aqueous potassium hydroxide solution (6 mol/L) containing 30 g/L lithium hydroxide. A ratio between a negative electrode capacity and a positive electrode capacity (N/P) was adjusted to 2.5. As used herein, a cell container was a pressure-resistant container. Spiral-wound cells with a nominal capacity of 1000 mAh were thus fabricated. Each of the cells was filled with hydrogen gas with 0.4 MPa of pressure, was charged and discharged once at 0.1 CA, 0.2 CA, and 0.5 CA, respectively, and was subjected to aging treatment. Thereafter, each of the cells was subjected to a 1-CA constant-current charge-discharge test for comparing the cell capacities after the respective cycles. Other conditions are the same as those in Test Result 1 unless otherwise specified.

Table 2 shows the life characteristics of the cells in which the different carbon materials are used as the respective positive electrode conductive agents. It is apparent from Table 2 that each of the hydrogen gas-filled cells has the satisfactory cell capacity.

TABLE 2

| Positive electrode conductive agent | Cell capacity | | | |
|---|---|---|---|---|
| | 10 cycles | 100 cycles | 200 cycles | 500 cycles |
| Soft carbon | 71.1% | 75.5% | 76.7% | 76.3% |
| AB | 78.6% | 79.0% | 79.4% | 78.7% |
| Soft carbon/AB | 72.7% | 76.1% | 76.5% | 76.6% |
| Soft carbon/graphite | 73.7% | 77.9% | 78.7% | 77.4% |

<Test Result 3> (Conductive Agent-Coated Positive Electrode Material)

As a positive electrode material, nickel hydroxide powder and soft carbon powder fired at 2300° C. were adjusted to 97 wt %:3 wt %. The resultant mixture was subjected to ball milling (400 rpm, 3 h) in a hydrogen gas atmosphere (0.3 MPa). Thus, the nickel hydroxide was coated with the soft carbon, and this soft carbon-coated nickel hydroxide was made composite.

A positive electrode was fabricated using the coated composite positive electrode material so as to have a composition of the soft carbon-nickel hydroxide composite (97.2 wt %), a carbon material (2 wt %), a polyolefin binder (0.5 wt %), an acrylic acid-based thickener (0.15 wt %), and a nonionic surfactant (0.15 wt %). A negative electrode corresponding to a counter electrode was fabricated in such a manner that an AB5 hydrogen storage alloy was applied to a perforated metal substrate. As used herein, a separator was a 130 μm-thick polypropylene nonwoven fabric (available from Japan Vilene) subjected to sulfonating treatment. As used herein, an electrolyte was an aqueous potassium hydroxide solution (6 mol/L) containing 30 g/L lithium hydroxide. A ratio between a negative electrode capacity and a positive electrode capacity (N/P) was adjusted to 2. As used herein, a cell container was a pressure-resistant container. Spiral-wound cells with a nominal capacity of 1000 mAh were thus fabricated. Each of the cells was filled with hydrogen gas with 0.2 MPa of pressure, was charged and discharged once at 0.1 CA, 0.2 CA, and 0.5 CA, respectively, and was subjected to aging treatment. Thereafter, each of the cells was subjected to a high rate discharge test at 1 CA, 2 CA, 5CA, and 7.5 CA, for evaluating the output characteristics. Other conditions are the same as those in Test Result 1 unless otherwise specified.

Figure 6:
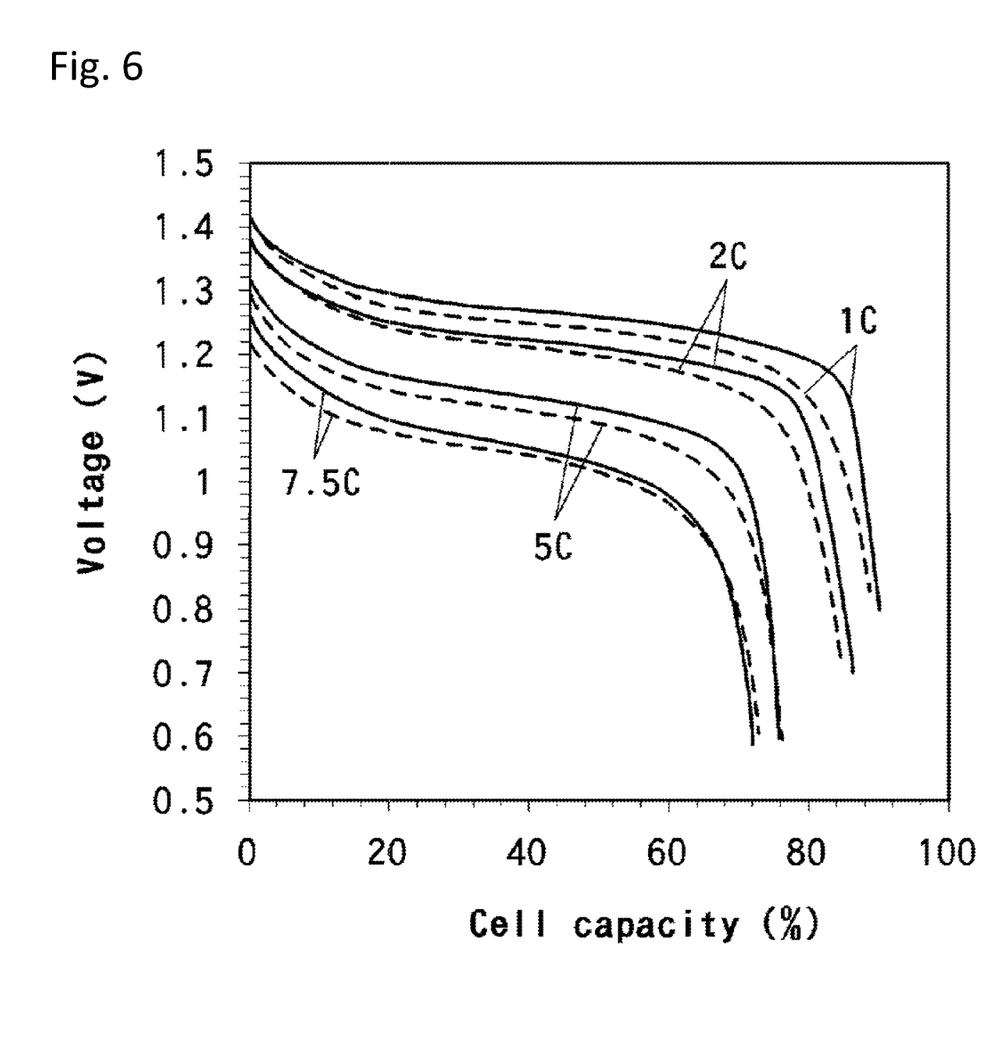
FIG. 6 is a graph of discharge characteristics of cells.

FIG. 6 illustrates, for comparison, high rate discharge curves as to a cell in which a soft carbon-nickel hydroxide composite is used as a positive electrode material and a cell in which untreated nickel hydroxide is used as a positive electrode material. It is apparent from FIG. 6 that the cell (shown with a sold line) in which the soft carbon-nickel hydroxide composite is used as the positive electrode material is more excellent in output characteristic than the cell (shown with a broken line) in which nickel hydroxide and soft carbon are simply blended.

With regard to the positive electrode material, if the amount of the soft carbon powder fired at 2300° C. is more than 5 wt % relative to 100 wt % of the total amount of the nickel hydroxide powder and the soft carbon powder, the bulk of the resultant conductive positive electrode material increases, so that a highly dense electrode cannot be obtained. On the other hand, if the amount of the soft carbon powder is small, the conductivity is not improved. Therefore, the amount of the soft carbon powder is preferably 2 to 5 wt % for obtaining the appropriate soft carbon-nickel hydroxide composite.

<Test Result 4> (Hydrogen-Resistant Separator and Binder)

As used herein, a separator was a 130 μm-thick polypropylene nonwoven fabric (available from Japan Vilene) subjected to fluorine gas treatment. As used herein, a binder was a fluorine binder (0.5 wt %). Other conditions are the same as those in Test Result 1 unless otherwise specified.

A cell in Test Result 4 is almost similar in charge-discharge characteristic to the cells in Test Result 1.

<Test Results of Negative Electrode>

Figure 7:
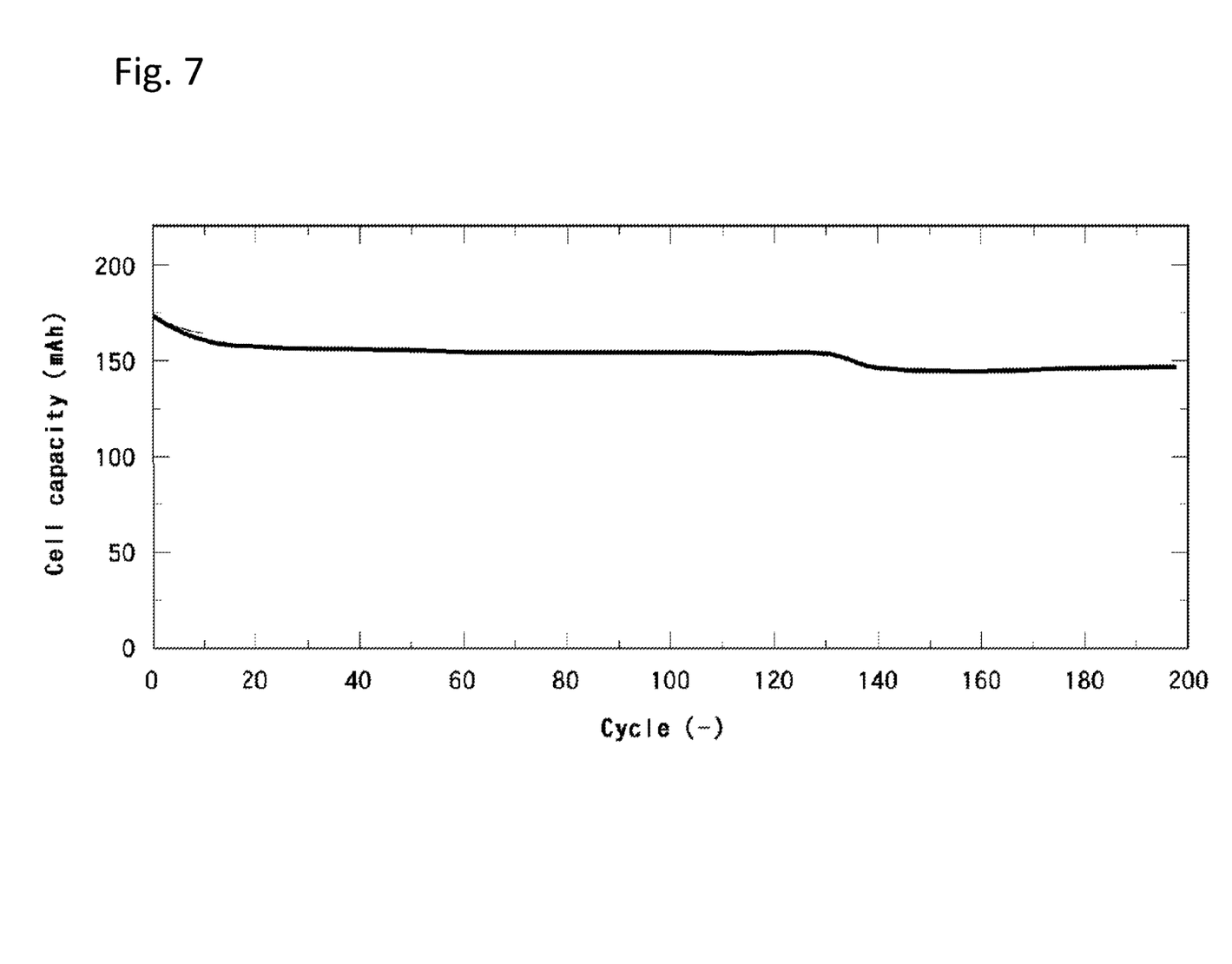
FIG. 7 is a graph of a cycle life characteristic of a negative electrode under a hydrogen atmosphere.
Figure 8:
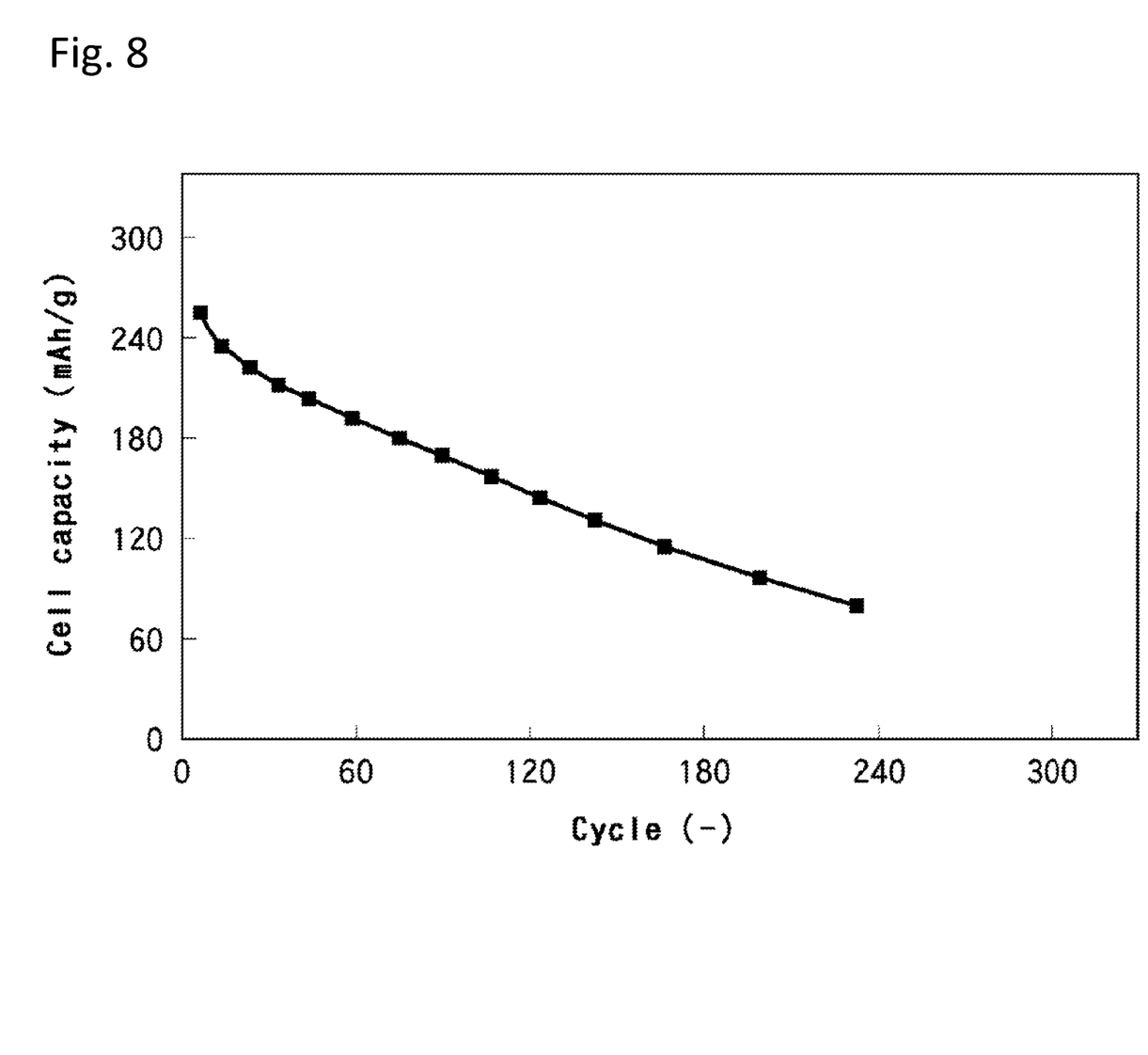
FIG. 8 is a graph of a cycle characteristic of a negative electrode in a conventional nickel-metal hydride cell.

A half-cell was fabricated, which included a 150-mAh negative electrode formed of a perforated metal substrate applied with an AB5 hydrogen storage alloy, and a silver reference electrode. The half-cell was fully charged and discharged under a hydrogen gas atmosphere at a pressure of 100 MPa, and the cycle life characteristic was evaluated. FIG. 7 illustrates the result of evaluation. FIG. 8 illustrates an exemplary charge-discharge cycle characteristic of the negative electrode under an air atmosphere. With regard to the negative electrode in FIG. 8, which is different in specification from the negative electrode in FIG. 7, both the charge-discharge cycle characteristic and the discharge capacity were lowered. This is because the hydrogen storage alloy is degraded by oxidation. On the other hand, the result of evaluation in FIG. 7 is based on a test under a hydrogen atmosphere. Therefore, the hydrogen storage alloy is not oxidized, so that the half-cell exhibits a favorable cycle life characteristic.

INDUSTRIAL APPLICABILITY

The hydrogen gas-filled alkaline secondary cell is suitable for not only an industrial secondary cell but also a consumer secondary cell because of its long life and high capacity.

REFERENCE SIGNS LIST

1: Spiral-wound cell
2: Cell case
3: Positive electrode
4: Negative electrode
5: Separator
6: Cap
7: Sealing plate
11: Laminated cell
12: Cylindrical can
13: Electrode body
15: Outer jacket
16: Lid member
17: Current collector rod
19: Supply port
20: Hydrogen gas tank

The invention claimed is:

1. An alkaline secondary cell comprising:
a negative electrode containing a hydrogen storage alloy;
a positive electrode containing a positive electrode active material and a conductive agent; and
a separator disposed between the positive electrode and the negative electrode,
wherein
hydrogen gas is filled in the alkaline secondary cell,
the conductive agent includes partly graphitized soft carbon, and
the negative electrode and the positive electrode are in contact with the hydrogen gas.

2. The alkaline secondary cell of claim 1, wherein the partly graphitized soft carbon is obtained by firing a soft carbon precursor at 1500 to 2800° C.

3. The alkaline secondary cell of claim 1, wherein the partly graphitized soft carbon has a degree of graphitization from 0.3 or more to 0.8 or less analyzed by Raman spectroscopy.

4. The alkaline secondary cell of claim 1, wherein the partly graphitized soft carbon is granulated.

5. The alkaline secondary cell of claim 1, wherein the positive electrode active material in the positive electrode is coated with the partly graphitized soft carbon.

6. The alkaline secondary cell of claim 5, wherein the positive electrode active material is made composite.

7. The alkaline secondary cell of claim 5, wherein the partly graphitized soft carbon is contained in an amount of 2 to 5 wt % relative to 100 wt % of a sum of the positive electrode active material and the partly graphitized soft carbon.

8. The alkaline secondary cell of claim 1, wherein the hydrogen gas has a pressure from 0.2 to 278 MPa.

9. The alkaline secondary cell of claim 1, wherein the positive electrode contains no cobalt compound as the conductive agent.

10. The alkaline secondary cell of claim 1, wherein the separator is formed of a polyolefin nonwoven fabric subjected to fluorine gas treatment.

11. The alkaline secondary cell of claim 1, wherein the separator comprises a polyolefin nonwoven fabric, and the polyolefin nonwoven fabric is coated with a metal oxide.

12. The alkaline secondary cell of claim 11, wherein the metal oxide includes at least zirconia and yttrium oxide.

13. The alkaline secondary cell of claim 1, wherein the negative electrode and the positive electrode each contain polytetrafluoroethylene as a binder.

* * * * *